(No Model.)
A. WILBUR.
PIPE COUPLING.
No. 369,574. Patented Sept. 6, 1887.
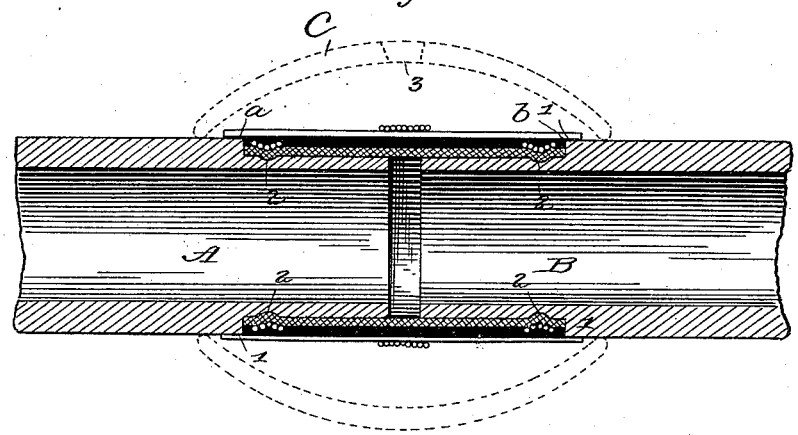
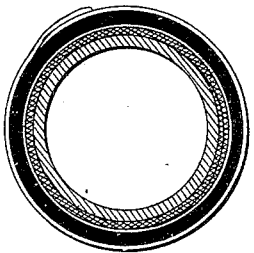
Attest:
Walter Donaldson
F. L. Middleton
Inventor
Alfred Wilbur
by Ellis Spear
Atty.
N. PETERS. Photo-Lithographer, Washington, D. C.

UNITED STATES PATENT OFFICE.

ALFRED WILBUR, OF ALLEGHENY CITY, PENNSYLVANIA.

PIPE-COUPLING.

SPECIFICATION forming part of Letters Patent No. 369,574, dated September 6, 1887.

Application filed April 20, 1887. Serial No. 235,526. (No model.)

*To all whom it may concern:*

Be it known that I, ALFRED WILBUR, of Allegheny City, in the State of Pennsylvania, have invented a new and useful Improvement in Pipe-Couplings; and I do hereby declare that the following is a full, clear, and exact description of the same.

My invention is an improvement in means for forming the connection between the ends of pipes; and my object is to provide a coupling which can be cheaply furnished and quickly and accurately adjusted to its proper position. I aim to provide a device which, while allowing slight movement of the pipes, will be of such a flexible or elastic character as will still operate to prevent the escape of any gas or water through the joint. Another object is to combine such elements in the device as will render the employment of screw-threads unnecessary upon either the pipe ends or the coupling itself.

My invention consists in the special devices and combination of devices which enable me to reduce my invention to a practical form and to carry out the above-named objects successfully.

In the drawings, Figure 1 represents a longitudinal section through the pipe ends with my improved form of coupling in place. Fig. 2 is a transverse section.

A B represent the pipes. The ends are cut down, as shown at 1, the reduced portion extending back upon each pipe a suitable distance, as desired, to form a seat for the coupling devices. When the two pipe ends are brought near together, a channel or groove is thereby formed between the shoulders *a b*, extending peripherally about the said ends. In the reduced portion of each pipe end I form a small groove, 2, extending about the pipe, and situated at or near the shoulder *a* or *b*. In the space between the shoulders a strip of gum-cloth or other like material is placed, this being wrapped about the pipe ends and covering the space between them. This is of sufficient length to overlap itself an inch or more; or, if desired, it may be of such length as will permit it to be wound several times around the joint. The width of the strip corresponds to the distance between the shoulders *a b*, so that when wound it will fit snugly in the space. After being so wound, fine wire is bound around it at the points just over the small grooves 2, thus causing the gum to sink into the grooves and make a gas or water tight joint. The connection having been made thus far, I apply to the same a thick coating of molten asphaltum or any material of an elastic nature, and over this coat a jacket or sleeve of metal is placed to protect the said coating and retain it in proper position. The coating of asphaltum or other material may be applied with a brush, or it may be poured into the place after the metallic strip has been positioned.

I prefer to make the metallic jacket in the form of a band adapted to be wound about the joint and overlap itself. A binding of fine wire may also be employed here to secure the band in place. The band may be made of spring metal.

From the foregoing description it will be seen that a neat, efficient, and inexpensive coupling is provided by me. The cloth, when properly bound, precludes the possibility of any escape of gas, and the coating, while insuring this effect, also provides an elastic backing or base, which, together with its inclosing-jacket, renders the joint flexible and automatic in its adjustment to any displacement or sagging of the pipe, or to any inclination thereof arising from inequalities in the surface upon which the pipe is being laid. The joint, when formed, need not extend beyond the periphery of the pipe to any considerable degree. I do not limit myself to the grooves 2 2, as beads may be used in place of these with good results.

If desired, a sleeve, C, such as shown in dotted lines, may be placed over the entire joint, and the intermediate space can be filled with elastic material, the said material being introduced through a suitable opening, as 3. In this case the joint previously described would answer the purpose, also of preventing the packing from entering the space between the pipe ends. Should the sleeve C be employed it would not be absolutely necessary to apply the thick elastic coating to the gum-cloth, but it would be essential to use a thin coating of clay or like material to prevent the sleeve C, which is heated, or a metallic band or the molten material from damaging the gum-cloth while the joint is being made.

I am aware that it is not new to employ canvas or similar material wrapped about the pipe ends, and I do not claim this idea, broadly.

I claim as my invention—

1. In combination with pipe ends having cloth wrapped about them and secured thereto with a coating applied to said cloth and a metallic strip covering the cloth coating, a sleeve adapted to encircle the pipe ends so connected and a suitable filling for said sleeve, substantially as described.

2. A coupling for pipes, consisting of cloth wrapped around the ends thereof and secured, a plastic coating applied to said cloth, and a metallic strip wrapped closely around the coated cloth, substantially as described.

In testimony whereof I have signed my name to this specification in the presence of two subscribing witnesses.

ALFRED WILBUR.

Witnesses:
CLARENCE BURLEIGH,
HILARY B. BRUNOT.